United States Patent [19]

Wolfe, Jr.

[11] Patent Number: 4,629,761
[45] Date of Patent: Dec. 16, 1986

[54] THERMOPLASTIC COMPOSITIONS OF MULTI-BLOCK COPOLYESTER ELASTOMER AND CHLOROSULFONATED POLYETHYLENE

[75] Inventor: James R. Wolfe, Jr., Wilmington, Del.

[73] Assignee: E. I. Du Pont de Nemours and Company, Wilmington, Del.

[21] Appl. No.: 731,792

[22] Filed: May 8, 1985

[51] Int. Cl.$^4$ .................. C08L 67/02; C08L 23/34
[52] U.S. Cl. .................................... 525/92; 525/173
[58] Field of Search ......................... 525/92, 173

[56] References Cited

U.S. PATENT DOCUMENTS

| | | | |
|---|---|---|---|
| Re. 28,688 | 1/1976 | Cook | 260/4 |
| 4,110,411 | 8/1978 | Imanaka | 525/92 |
| 4,141,863 | 2/1979 | Coran et al. | 260/3 |
| 4,141,878 | 2/1979 | Coran et al. | 260/336 |
| 4,290,927 | 9/1981 | Tanaka | 525/165 |

OTHER PUBLICATIONS

Hourston and Hughes, Polymer 21 (4), pp. 469–472 (1980).

Primary Examiner—John C. Bleutge
Assistant Examiner—Patricia Short

[57] ABSTRACT

A thermoplastic composition comprising about 10–80 parts by weight total polymers of a multi-block copolyester elastomer having a melting point of from about 100°–200° C. and about 20–90 parts by weight total polymers of a crosslinked chlorosulfonated polyethylene elastomer dispersed in said copolyester elastomer, said chlorosulfonated polyethylene elastomer being crosslinked to an extent such that not more than about 45% by weight of said elastomer is extractable with toluene at 25°0 C.

14 Claims, No Drawings

THERMOPLASTIC COMPOSITIONS OF MULTI-BLOCK COPOLYESTER ELASTOMER AND CHLOROSULFONATED POLYETHYLENE

BACKGROUND OF THE INVENTION

Copolyester elastomers are thermoplastic polymers which are easily processed but they lack the important physical characteristic of good compression set resistance found in vulcanized thermoset elastomers. Further, copolyester elastomers exhibit high permanent set values and a draw plateau when elongated.

There has been a need in the industry to develop a thermoplastic composition having improved compression set resistance so that the dimensions of an article of manufacture, for example, the thickness of seals, will be restored after pressure that has been applied is released. Also, multi-block copolyester elastomers are deficient in resistance to permanent set. It is important for the material to return to substantially its original form after deformation by extension. For some uses, for example, gaskets and seals, multi-block copolyester elastomers are harder than desirable and either cannot be used or they are limited in their uses for such applications. Multi-block copolyester elastomers are not especially scuff resistant and there is a need to improve this characteristic. Also, there is a need for elastomeric thermoplastic compositions which do not have the draw plateau that is observed for multi-block copolyester elastomers.

Although multi-block copolyester elastomers are not normally compounded with fillers and extenders, the thermoplastic elastomeric compositions of the present invention can accept substantial amounts of processing oils and/or fillers while still retaining good physical properties. The incorporation of fillers and/or extenders in the thermoplastic compositions of the present invention is beneficial because it lessens the cost of the polymers, makes processing easier and improves properties such as tear strength. The thermoplastic compositions of the present invention have good compression set resistance, improved resistance to permanent set relative to copolyester elastomers, they are scuff resistant and softer than copolyester elastomers. Further, the compositions show good resistance to oil swell and they can be readily processed by conventional means used for thermoplastic compositions.

SUMMARY OF THE INVENTION

This invention is directed to a thermoplastic composition comprising about 10–80 parts by weight total polymers of a multi-block copolyester elastomer having a melting point of from about 100°–200° C. and about 20–90 parts by weight total polymers of a crosslinked chlorosulfonated polyethylene elastomer dispersed in said copolyester elastomer, said chlorosulfonated polyethylene elastomer being crosslinked to an extent such that not more than about 45% by weight, preferably 35% by weight, of said elastomer is extractable with toluene at 25° C. Preferably, the thermoplastic composition comprises a multi-block copolyester elastomer that consists essentially of (A) repeating high melting point blocks comprising repeating short chain ester units having the formula:

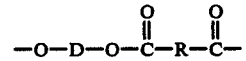

wherein D is a divalent radical remaining after removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer which consists essentially of short-chain ester units having a number average molecular weight of at least 5000 has a melting point above 100° C., (B) repeating low melting point blocks which are derived from compounds containing two hydroxyl or carboxyl groups or mixtures thereof and has a number average molecular weight of 400–4000 and a melting point not greater than 100° C., preferably not greater than 75° C., and (C) an amount of difunctional radicals sufficient to join repeating blocks of (A) and (B) to form a multi-block copolyester elastomer, the weight ratio of (A) to (B) being from about 1:4 to 1:0.1, preferably 1:2 to 1:0.5.

The chlorosulfonated polyethylene usually contains from about 15–50% by weight chlorine and about 0.1–4% by weight sulfur as sulfonyl chloride groups.

The thermoplastic elastomer compositions can be prepared by mixing and shearing uncured chlorosulfonated polyethylene with a molten multi-block copolyester elastomer, preferably in a high shear mixer, and carrying out curing of the chlorosulfonated polyethylene simultaneously with the mixing operation. Alternatively, the chlorosulfonated polyethylene can be cured alone, then finely divided into a powder, and the powder mixed with the molten multi-block copolyester elastomer while shearing. In order for the compositions to process well as thermoplastics the crosslinked chlorosulfonated polyethylene elastomer component must be dispersed in the multi-block copolyester elastomer during mixing.

DETAILED DESCRIPTION OF PREFERRED EMBODIMENTS

The thermoplastic multi-block copolyester elastomers used as a component in this invention consist essentially of repeating blocks of repeating short chain ester units, as described above, which have high melting points (above 100° C.) and repeating low melting point blocks (not greater than 100° C., preferably below 75° C.) which are derived from difunctional compounds having a number average molecular weight of about 400–4000. The low melting point and high melting point blocks are joined together by difunctional radicals which, for example, can be derived by reaction of the high or low melting point blocks with diols, dicarboxylic acids, diepoxides, bis(acyl lactams) and diisocyanates. The high melting point blocks crystallize at useful service temperatures to provide physical crosslinks in the multi-block elastomer while the low melting point blocks provide elastomer characteristics. At processing temperatures, generally of the order of about 100°–220° C., preferably 140°–190° C., the high melting point blocks melt and the polymer is molten.

Multi-block copolyester elastomers of the type described herein which have high melting points, e.g. above about 200° C., do not blend readily with chlorosulfonated polyethylene elastomers at safe processing temperatures for the chlorosulfonated polyethylene elastomers. Therefore, the multi-block copolyester elastomers used in this invention have melting points no more than about 200° C. If the multi-block copolyester elastomers have melting points below about 100° C., the resulting composition of copolyester elastomer and chlorosulfonated polyethylene elastomer will have a limited useful temperature range. Preferably, the melting point of the multi-block copolyester elastomers used as a component of the blend is from about 130° C.-180° C.

The high melting point blocks which comprise repeating short chain ester units of the formula

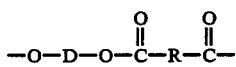

derived from one or more low molecular weight diols, HODOH, having a molecular weight not greater than 250 and one or more dicarboxylic acids, HOOCR-COOH, having a molecular weight of not greater than 300.

The term "low molecular weight diols" as used herein should be construed to include equivalent ester-forming derivatives, provided, however, that the molecular weight requirement pertains to the diol only and not to its derivatives.

Aliphatic or cycloaliphatic diols with 2-15 carbon atoms are preferred, such as ethylene, propylene, tetramethylene, pentamethylene, 2,2-dimethyltrimethylene, hexamethylene, and decamethylene glycols, dihydroxy cyclohexane and cyclohexane dimethanol. Unsaturated diols such as butene-2-diol-1,4 can also be used, particularly in minor amounts in admixture with a saturated diol.

The term "dicarboxylic acids" as used herein, includes equivalents of dicarboxylic acids having two functional carboxyl groups which perform substantially like dicarboxylic acids in reaction with glycols and diols in forming multi-block copolyester elastomers. These equivalents include esters and ester-forming derivatives, such as acid anhydrides. The molecular weight requirement pertains to the acid and not to its equivalent ester or ester-forming derivative.

Among the aromatic dicarboxylic acids for preparing the copolyester elastomers that are used, those with 8-16 carbon atoms are preferred, particularly the phenylene dicarboxylic acids, i.e., phthalic, terephthalic and isophthalic acids and their dimethyl esters.

The diol and dicarboxylic acid must be chosen to provide a melting point of at least 100° C. for a polymer having a number average molecular weight of at least 5000 and which is derived exclusively from short chain ester units. Preferred high melting point blocks are derived from ethylene glycol, 1,4-butanediol or hexanediol by reaction with terephthalic acid alone or in admixture with up to about 30% by weight isophthalic acid or phthalic acid or mixtures thereof. Polymers based solely or principally on 1,4-butanediol are especially preferred.

The low melting point blocks in said multi-block copolyester elastomers can be provided by a variety of difunctional compounds having number average molecular weights of 400-4000 which contain hydroxyl groups or carboxyl groups or mixtures thereof. Suitable compounds for forming low melting point blocks include poly(alkylene oxide) glycols, low melting point polyester glycols and hydrocarbon glycols or diacids.

Representative poly(alkylene oxide) glycols have a carbon-to-oxygen atomic ratio of about 2.0-4.3 and a number average molecular weight of about 400-4000 and include poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide. Preferred poly(alkylene oxide) glycols include poly(tetramethylene oxide) glycol having a number average molecular weight of 600-2000, especially 800-1200, and ethylene oxide-capped poly(propylene oxide) glycol having a number average molecular weight of 1500-2800 and an ethylene oxide content of 15-35% by weight.

The required low melting point blocks (i.e., not greater than about 100° C., and, preferably, below about 75° C.) from polyester glycols are either polylactones or the reaction products of low molecular weight diols (i.e., less than about 250) and aliphatic dicarboxylic acids. Representative low melting point polyester glycols are obtained by reaction of diols such as ethylene glycol, 1,4-butanediol, pentanediol, hexanediol, 2,2-dimethyl-1,3-propanediol and mixtures of ethylene glycol and propylene glycol with diacids such as adipic acid, glutaric acid, pimelic acid, suberic acid and isosebacic acid. Polylactone glycols derived from unsubstituted and substituted caprolactone or butyrolactone are also useful as low melting point polyester glycols. Preferred polyester glycols include polycaprolactone glycol and poly(tetramethylene adipate) glycol having number average molecular weights of 800-2500.

Representative hydrocarbon glycols or diacid derivatives which can be used to provide low melting point blocks include polybutadiene or polyisoprene glycols and saturated hydrogenation products of these materials. Dicarboxylic acids formed by oxidation of polyisobutylene/diene copolymers are also useful materials. Dimer acid, particularly the more highly refined grades, is a useful hydrocarbon diacid which can be used alone or in combination with other low melting point compounds such as the poly(alkylene oxide) glycols to provide low melting point blocks.

As previously indicated, multi-block copolyester elastomers used as a component of the thermoplastic compositions of the present invention must have melting points which are not above about 200° C. Since copolyester elastomers based exclusively on butylene terephthalate units or exclusively on ethylene terephthalate units for the high melting point blocks will often melt above 200° C., it may be necessary to introduce minor amounts of a second diol or diacid to lower the polymer melting point. The general relationship between monomer mole fraction and polymer melting point is discussed by Flory, Principles of Polymer Chemistry, page 570, Cornell University Press, 1953. Flory has suggested that the copolymer melting point ($T_m$) depends upon homopolymer's melting point ($T_m°$), the homopolymer mole fraction ($N_A$), homopolymer heat of fusion ($\Delta H\mu$) and the gas constant (R) by the following expression:

$$1/T_m - 1/T_m° = -(R/\Delta H\mu) \ln N_A$$

This equation has been found to be reasonably valid for the class of multi-block copolyester elastomers employed in the compositions of this invention. For multi-block copolyester elastomers in which the major short chain ester units are 1,4-butylene terephthalate units, $T_m°=234°$ C. and $\Delta H\mu=12.1$ cal./g. To prepare copolyester elastomers having melting points no more than about 200° C., it can be calculated that the mole fraction of 1,4-butylene terephthalate units must be less than about 82.5%. The calculated value is supported by the observed melting points of a number of copolyester elastomers based on 1,4-butylene terephthalate units. Similar calculations can be made for other short chain units if the homopolymer melting point and heat of fusion are known.

The multi-block copolyester elastomers described herein can be made by procedures known in the art. Elastomers in which the low melting point blocks are provided by poly(alkylene oxide) glycols or hydrocarbon glycols or diacids are readily made by ester interchange reactions followed by polycondensation. Different procedures are required when the low melting point block is provided by a polyester glycol because ester exchange can take place with the high melting point ester blocks which ultimately destroys the blockiness of the polymer.

A typical procedure for preparing elastomers by ester interchange involves heating a dicarboxylic acid or its methyl ester with a poly(alkylene oxide) glycol or hydrocarbon glycol or diacid or mixtures thereof and a molar excess of low molecular weight diol in the presence of a catalyst at about 150°–260° C. and a pressure of 0.05 to 0.5 MPa, usually ambient pressure, while distilling off water formed by esterification and/or methanol formed by ester interchange. The glycol or the diacid that provides the low melting point blocks is incorporated into the polymer through difunctional radicals provided by the dicarboxylic acid in the case of the glycols, or by the low molecular weight diols in the case of the diacids. The particular amount of difunctional radicals incorporated into the polymer to join the high and low melting point blocks will vary and depends on the molecular weights and the ratio of the high and low melting point blocks and the functional groups on the blocks. However, in all cases the difunctional radicals constitute a minor amount of the total weight of the polymer.

Depending on temperature, catalyst, glycol excess and equipment, this reaction can be completed within a few minutes, e.g., about two minutes, to a few hours, e.g., about two hours. This procedure results in the preparation of a low molecular weight prepolymer which can be carried to a high molecular weight multi-block elastomer by distillation of the excess of short-chain diol. This second process stage is known as "polycondensation".

Additional ester interchange occurs during this polycondensation which serves to increase the molecular weight of the polymer. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in an amount of about 0.005 to 2.0 percent by weight based on total reactants.

Both batch and continuous methods can be used for any stage of polymer preparation. Polycondensation of prepolymer can also be accomplished in the solid phase by heating divided solid prepolymer in a vacuum or in a stream of inert gas to remove liberated low molecular weight diol.

Several procedures have been used to prepare multi-block copolyester elastomers wherein the low melting point blocks are polyesters as well as the high melting point blocks. One procedure involves carrying out a limited ester interchange reaction in the presence of an exchange catalyst between two high molecular weight polymers such as poly(butylene terephthalate) and poly(butylene adipate). Ester exchange at first causes the introduction of blocks of one polyester into the other polyester chain and vice versa. When the desired multi-block polymer structure is formed the catalyst is deactivated to prevent further interchange which ultimately would lead to a random copolyester without any blockiness. This procedure is described in detail in U.S. Pat. No. 4,031,165 to Saiki et al. Other useful procedures involve coupling of preformed blocks of high and low melting point polyester glycols. Coupling can be accomplished by reaction of a mixture of the blocks with a diisocyanate, as described in European Pat. No. 0013461 to Huntjens et al. Coupling can also be accomplished by heating the mixed blocks in the presence of terephthaloyl or isophthaloyl bis-caprolactam addition compounds. The caprolactam addition compounds react readily with the terminal hydroxyl groups of the polyester blocks joining the blocks. This coupling method is described in Japanese Pat. No. 700740 (Japanese Patent Publication No. 73/4115). Another procedure of use when the low melting blocks are to be provided by polycaprolactone involves reacting a preformed high melting point block terminated with hydroxyl groups with epsilon-caprolactone in the presence of a catalyst such as dibutyl tin dilaurate. The caprolactone polymerizes on the hydroxyl groups of the high melting point ester block which groups serve as initiators. The resulting product is a relatively low molecular weight triblock polymer having the high melting point block in the middle with low melting point polycaprolactone blocks on each end. The triblock polymer is hydroxyl terminated and may be joined to give a finished product by reaction with a diepoxide such as diethylene glycol diglycidyl ether, (see, for example, Japanese Patent Publication No. 83/162654).

The chlorosulfonated polyethylene elastomers used to prepare the compositions of the present invention contain from about 15–50% by weight chlorine, usually 20–45% by weight. If sufficient chlorine atoms are not substituted on the backbone carbon atoms of the polyethylene, the crystallinity of the polymer is not sufficiently interrupted and its elastomeric properties are poor. If more than about 50% by weight chlorine atoms are substituted on the backbone carbon atoms, the polymer becomes stiff.

The chlorosulfonated polyethylene contains from about 0.1–4% by weight, usually 0.6–2% by weight, sulfur as sulfonyl chloride groups.

The thermoplastic multi-block copolyester elastomers in amounts of about 10–80 parts by weight total polymers are blended with about 20–90 parts by weight total polymers of chlorosulfonated polyethylene, preferably, 20–60 parts copolyester by weight total polymers are blended with about 40-80 parts chlorosulfonated polyethylene by weight total polymers.

The mixing of the thermoplastic multi-block copolyester elastomers with the chlorosulfonated polyethylene elastomers is accomplished by any one of a number of conventional techniques, for example, in a Banbury mixer, two-roll mill or extruder. This mixing is done at a temperature high enough to soften the polymers for adequate mixing, but not so high as to degrade the chlorosulfonated polyethylene. Generally, mixing is done at a temperature range from about 100°-220° C., preferably 140°-190° C. Mixing is carried out for a time sufficient to allow for crosslinking of the chlorosulfonated polyethylene and for shearing and dispersing the chlorosulfonated polyethylene substantially uniformly throughout the copolyester. Adequacy of mixing can be determined by observing the processability of the compositions by means of a piston rheometer. If the degree of mixing is inadequate as indicated by poor extrudability at processing temperatures, additional mixing at the original mixing temperature or at lower temperatures can be employed to further comminute and disperse the crosslinked chlorosulfonated polyethylene in the multi-block copolyester elastomer in order to obtain satisfactory thermoplastic processability.

An important aspect of the process for making the thermoplastic composition is crosslinking the chlorosulfonated polyethylene elastomer component of the composition. Crosslinking is carried out using any one or more of the well known crosslinking system for chlorosulfonated polyethylenes. Typical crosslinking systems consist of an acid acceptor and a vulcanizing agent or accelerator. Representative acid acceptors include organic lead bases, epoxies, and metal oxides such as litharge, magnesia, and calcium oxide or hydroxide. Representative vulcanizing agents include bismaleimides, peroxides, sulfur, and sulfur-bearing accelerators such as dipentamethylene thiuram hexasulfide. If desired, various conventional activators may be added to enhance the crosslinking rate. The crosslinking of the chlorosulfonated polyethylene can be carried out before or concurrently with mixing the elastomer with the multi-block copolyester. If the chlorosulfonated polyethylene is crosslinked prior to mixing, it is necessary to pulverize or powder the cured elastomer before mixing. In this instance no cure is involved during mixing. The high shear mixers mentioned above can be conveniently used to mix the elastomer powder with the copolyester elastomer. Representative crosslinking systems for the chlorosulfonated polyethylene include:

N,N'-meta-phenylenedimaleimide plus butyraldehyde-aniline condensation product plus calcium oxide; N,N'-meta-phenylenedimaleimide plus 40% dicumyl peroxide on calcium carbonate; magnesium oxide plus pentaerythritol plus dipentamethylene thiuram hexasulfide; epoxy resins (e.g., Epon 828) plus pentaerythritol plus dipentamethylene thiuram hexasulfide plus 2,2'-dibenzothiazyl disulfide; fumed litharge plus dipentamethylene thiuram hexasulfide plus 2,2'-dibenzothiazyl disulfide.

The term crosslinked refers to a degree of crosslinking such that the chlorosulfonated polyethylene elastomers when mixed with the multi-block copolyester elastomers yield a thermoplastic elastomeric composition in which not more than 45% by weight of the chlorosulfonated polyethylene elastomer is extractable with toluene at 25° C., the balance, i.e, at least about 55% by weight of the chlorosulfonated polyethylene is gelled to the point of insolubility. To quantify the degree of crosslinking the amount of insoluble, and hence crosslinked polymer is determined by leaching a sample of the polymer, after crosslinking, in toluene at 25° C. for 48 hours, isolating the insoluble portion and weighing the dried residue, making suitable corrections based upon knowledge of the composition. For example, the weight of components soluble in toluene such as extenders and processing oils are subtracted from the initial weight; and components insoluble in toluene, such as pigments, fillers, etc. are subtracted from both the initial and final weight. Small amounts of the order of 3-4 percent by weight of the multi-block copolyester elastomer are soluble in toluene at 25° C. and such amounts should be taken into consideration when determining the degree of crosslinking of the chlorosulfonated polyethylene elastomer. The insoluble polymer recovered is reported as percent by weight gel content. For purposes of the subject invention, the chlorosulfonated polyethylene elastomer component of the compositions need to be crosslinked so that not more than 45% by weight of the elastomer is extractable with toluene at 25° C., preferably not more than 35% by weight. Thus the chlorosulfonated polyethylenes have a gel content of at least 55 percent by weight, preferably at least 65 percent by weight. The conditions under which this crosslinking is carried out, i.e., type and quantity of crosslinking agent, crosslinking time and temperature, to arrive at a polymer having a gel content within this operable range, can be determined empirically and is well known in the art of making chlorosulfonated polyethylene elastomers. When chemical crosslinking agents are utilized, e.g., peroxides, it is preferable that they be substantially totally consumed during the crosslinking step.

Although not essential components of the composition of this invention, preferably, especially from a cost standpoint, various amounts of any number of conventional fillers or compounding ingredients normally used with elastomers may be admixed with the compositions of this invention. Examples of such ingredients include extending oils and fillers, such as various carbon blacks, clays, silica, alumina, calcium carbonate; pigments, such as titanium dioxide; antioxidants; antidegradants; tackifiers; processing aids such as lubricants and waxes; and plasticizers such as dialkylphthalates; trialkylmellitates and polyester oligomers. It is preferable to add processing oils and fillers to the thermoplastic composition to improve its processing characteristics and the amounts used depend, at least in part, upon the quantities of other ingredients in the composition and the properties desired from the composition.

The compositions of the subject invention are melt processible using conventional plastic processing equipment. Articles molded from the thermoplastic elastomeric compositions of the present invention exhibit properties generally only associated with vulcanized rubber. For example, these compositions have resistance to compression set values of about 20 to 65 percent (at 70° C.); and elongation at break values of 150 to 700 percent. Various uses for the thermoplastic elastomer compositions include wire coverings, seals and gaskets, automotive parts, sheet liners and packaging films. They can be used to coat fabric, industrial belts and various hard surfaces by extrusion coating, for example, on substrates made from polyester, polyamide, polyimide or metal fibre or fabric reinforcement. They find utility in adhesive and sealant applications, as well as for modification of other polymer systems.

Further, thermoplastic elastomeric compositions within the scope of this invention can be fabricated into tubing for laboratory, medical and industrial uses. Such tubing could also be used as the inner tube of reinforced hoses, wherein the extruded tube is overlaid with wire or textile cords, applied as a spiral, knit or braid. Optionally, a polymeric covering may be applied (extruded or spiral wound calendered sheet) over the reinforced tubing to provide protection from the working environment and mechanical abuse. Compositions within the scope of this invention can be used as the protective covering of reinforced tubes of similar or different composition.

The following examples, in which parts are by weight, unless otherwise indicated, are illustrative of the present invention and show advantages resulting therefrom.

EXAMPLES

General Procedures for Preparing Thermoplastic Compositions

The polymers to be mixed were charged to a preheated Brabender Plastograph laboratory-size mixer equipped with cam-type blades. Mixer speed was maintained at about 90 rpm during the mixing procedure. After mixing the two polymers together for six minutes, crosslinking agents were added and mixing was continued for the times noted in the Examples. The temperature of the polymer mixture often rose above the preheat temperature of the Plastograph during mixing. The resulting polymer compositions were removed from the Plastograph, allowed to cool, and then individually blended for about three minutes on a two-roll rubber mill at the temperatures noted. The polymer compositions were then remixed in the preheated Plastograph at about 90 rpm for the times noted in the Examples.

| Polymer Test Methods Test specimens were cut from slabs | |
|---|---|
| | Test methods used were: |
| compression molded at 200° C. | |
| tensile strength at break at 8.5 mm/s | ASTM D412, die C |
| elongation at break at 8.5 mm/s | ASTM D412, die C |
| permanent set 5 min. after break | ASTM D412, die C |
| compression set after 22 hrs/70° C. method B | ASTM D395 |
| volume swell in ASTM #3 oil | ASTM D471 |
| tear strength at 21 mm/s | ASTM D1938 |

Stress-strain measurements were run on test specimens approximately 1 mm in thickness. Specimens used in the tear-strength test were cut from about 0.8 mm thick slabs and were 37 by 75 mm rectangles slit lengthwise to their center. Specimens for oil-swell tests were cut from 1.9 mm thick slabs which were remolded from previously molded slabs in order to demonstrate the remoldability of the blends. Compression sets were measured using 13 mm diameter discs died out of about 2 mm thick slabs and piled up to a thickness of about 13 mm.

The amounts of toluene-extractable materials in the compositions were determined by immersion for 48 hr in 500 ml of toluene at 25° C. of 1.7 g samples pressed to a thickness of about 0.2 mm. The percent of toluene-soluble chlorosulfonated polyethylene in the blends was calculated from the initial and final dry-sample weights after correcting for the small amount of material (3-4% by wt) extractable by toluene from the multi-block copolyester elastomer component of the compositions as determined by toluene extraction of nonblended copolyester elastomer.

Polymers Employed

Characteristics of five different chlorosulfonated polyethylene elastomers used as components in the blend illustrating the invention are listed below:

| Chlorosulfonated Polyethylene (CSPE) | Weight % of Chlorine | Sulfur | Specific Gravity | Mooney Viscosity ML 1 + 4 at 100° C. |
|---|---|---|---|---|
| CSPE A | 29 | 1.4 | 1.14 | 28 |
| CSPE B | 43 | 1.1 | 1.27 | 30 |
| CSPE C | 35 | 1.0 | 1.18 | 56 |
| CSPE D | 36 | 1.0 | 1.20 | 97 |
| CSPE E | 43 | 1.0 | 1.26 | 78 |

The multi-block copolyester elastomers used as components in the blend illustrating the invention are listed below:

| Multi-Block Copolyesters | Shore D Hardness | Specific Gravity | Melt Index at 190° C., g/10 min | Melting Point, °C. |
|---|---|---|---|---|
| Copolyester A | 40 | 1.17 | 5 | 168 |
| Copolyester B | 40 | 1.18 | 5 | 173 |

Copolyester A is prepared by reacting a mixture of 40.2 parts dimethyl terephthalate, 11.7 parts dimethyl isophthalate, 44.9 parts poly(tetramethylene oxide) glycol having a number average molecule weight of about 1000, and 20 parts of butanediol in the presence of 0.1 part tetrabutyl titanate catalyst. The reaction conditions are substantially identical to those disclosed in Example 1 of U.S. Pat. No. 3,652,014.

Copolyester B is prepared by reacting a mixture of 39.4 parts dimethyl terephthalate, 11.4 parts dimethyl isophthalate, 42.7 parts of ethylene oxide-capped poly(propylene oxide) glycol having a number average molecular weight of about 2160 and an ethylene oxide content of 26% by weight and 22 parts of butanediol in the presence of 0.2 parts tetrabutyl titanate catalyst. The reaction conditions are substantially identical to those disclosed in Example 1 of U.S. Pat. No. 3,651,014.

EXAMPLE 1

Before blending, the CSPE and the copolyester elastomers were dried for 2 hours at 120° C. under reduced pressure with a nitrogen atmosphere. A series of compositions containing varying amounts of the multi-block Copolyester A and Chlorosulfonated polyethylene elastomer C were prepared. Conventional crosslinking agents were added during mixing to effect crosslinking of the chlorosulfonated polyethylene.

The compositions were prepared by mixing the polymers together for 6 minutes in a Brabender Plastograph preheated to 160° C., adding 4 parts per 100 parts of blended polymers (phr) of calcium oxide and mixing for 1 minute, adding 3 parts phr of the crosslinking agent, N,N'-meta-phenylenedimaleimide ("HVA-2"), and mixing for 1 minute, adding 2 parts phr of butyraldehyde-aniline condensation product ("Vanox AT") which is an initiator for crosslinking, and mixing for 6 minutes. The compositions were then mixed for about 3 minutes on a 2-roll rubber mill heated to about 160° C. and finally for an additional 2 minutes in the Plastograph preheated to 160° C.

A second series of blends of Copolyester A and Chlorosulfonated polyethylene C were prepared containing the same ratios of the two polymers as the first series and made under the same conditions but without crosslinking agent and initiator. This second series was prepared by mixing the polymers together for 14 minutes in the Brabender Plastograph preheated to 160° C. followed by mixing for about 3 minutes on a hot two-roll rubber mill and then for an additional 2 minutes in the Plastograph preheated to 160° C. The total mixing time, temperature, and speed were substantially the same for the two series of blends.

The polymer proportions and the properties of the two series of compositions are listed in Table I. Those compositions identified as 1C-8C were prepared using crosslinking agents and are illustrative of the invention. Those blends identified as 1N-8N were prepared without added crosslinking agents and are included only for comparison purposes.

tion at break than the 35% permanent set at break as a percentage of elongation at break value for multi-block Copolyester elastomer A.

EXAMPLE 2

Before mixing, the polymers were dried for 2 hours at 120° C. under reduced pressure with a nitrogen atmosphere. A variety of chlorosulfonated polyethylene elastomers, as indicated in Table 2, were mixed with multi-block copolyester elastomers in the ratio 60 parts (wt) of chlorosulfonated polyethylene to 40 parts (wt) of multi-block copolyester elastomer. Compositions 9C-13C contain in addition to two polymers a crosslinking system for the chlorosulfonated polyethylene elastomer consisting of 2 parts per 100 parts of blended polymers of calcium oxide, 1.6 parts of the crosslinking agent N,N'-meta-phenylenedimaleimide, and 0.9 parts of the initiator and antioxidant butyraldehyde-aniline condensation product.

Compositions 9C-12C were prepared by mixing the polymers together for 6 minutes in a Brabender Plastograph preheated to 160° C., adding the calcium oxide

TABLE I

| Composition | Chlorosulfonated Polyethylene (wt %) | Copolyester Elastomer A (wt %) | Tensile Strength At Break (MPa) | Permanent Set at Break Percentage of Elongation at Break (%) | Elongation At Break (%) | Compression Set Resistance (%) | % Volume Swell ASTM #3 Oil 7 days 100° C. | Tensile Strength At Break At 100° C. (MPa) | Solubility in Toluene of Composition (wt %) | Chlorosulfonated Polyethylene (Wt %) |
|---|---|---|---|---|---|---|---|---|---|---|
| 1C | 20 | 80 | 27 | 30 | 600 | 61 | 32 | 6.3 | 5.0 | 14 |
| 1N | 20 | 80 | 21 | 38 | 905 | 67 | 41 | 3.9 | 17 | 71 |
| 2C | 30 | 70 | 24 | 29 | 510 | 59 | 35 | 5.3 | 5.6 | 13 |
| 2N | 30 | 70 | 13 | 36 | 700 | 70 | 56 | 3.0 | 26 | 77 |
| 3C | 40 | 60 | 22 | 26 | 445 | 63 | 42 | 4.9 | 5.9 | 11 |
| 3N | 40 | 60 | 9.0 | 36 | 690 | 72 | fused | 1.6 | 41 | 98 |
| 4C | 50 | 50 | 20 | 21 | 370 | 56 | 47 | 3.9 | 5.8 | 9.4 |
| 4N | 50 | 50 | 7.9 | 38 | 840 | 79 | fused | 1.0 | 51 | 99 |
| 5C | 60 | 40 | 21 | 16 | 325 | 51 | 51 | 2.9 | 6.0 | 8.8 |
| 5N | 60 | 40 | 4.6 | 38 | 1070 | 99+ | fused | 0.4 | 63 | 103 |
| 6C | 70 | 30 | 14 | 10 | 255 | 37 | 59 | 2.1 | 7.7 | 11 |
| 6N | 70 | 30 | 4.0 | — | 1560 | 100+ | melted | 0.3 | dispersed | — |
| 7C | 80 | 20 | 13 | 7.1 | 225 | 32 | 69 | 2.1 | 9.1 | 12 |
| 7N | 80 | 20 | 2.3 | — | 1530 | 100+ | melted | ~0 | dispersed | — |
| 8C | 90 | 10 | 6.0 | 3.5 | 200 | 22 | 96 | 1.0 | 12 | 14 |
| 8N | 90 | 10 | 1.6 | — | 1450 | 100+ | melted | ~0 | dispersed | — |

It can be seen from the results obtained and recorded in Table I above, the compositions of this invention excel in tensile strength at break at both room temperature and at 100° C., in resistance to compression set, and in resistance to oil swell. Both series of compositions were remoldable demonstrating their thermoplastic character even though there is a substantial amount of crosslinked chlorosulfonated polyethylene elastomer in the compositions of the present invention. In the oil swell test compositions 3N-8N containing 40% or more of chlorosulfonated polyethylene elastomer which had not been crosslinked absorbed so much oil that they either softened to the point where the samples fused together or at 70% or more chlorosulfonated polyethylene elastomer they melted or disintegrated. Toluene extraction of compositions 1C-8C demonstrated that more than 65% of the chlorosulfonated polyethylene elastomer component of the compositions was not extractable by toluene due to being crosslinked. Blends 6N-8N containing 70% or more chlorosulfonated polyethylene elastomer which had not been crosslinked disintegrated into small particles when immersed in toluene at room temperature for 48 hrs.

Compositions 1C-8C are lower in permanent set at break on an absolute basis and as a percentage of elongaand mixing for 1 minute, adding the N,N'-meta-phenylenedimaleimide and the butyraldehyde-aniline condensation product and mixing for 3 minutes past the time of maximum composition viscosity as measured by the torque to the Plastograph rotors. The compositions were then mixed for about 3 minutes on a two-roll rubber mill heated to about 165°-170° C. and finally for an additional 2 minutes in the Plastograph preheated to 160° C. Composition 13C was prepared in the same manner except the Plastograph and the rubber mill were preheated to 170° C. and the crosslinking system consisted of 2.4 parts of calcium oxide, 2 parts of the crosslinking agent N,N'-meta-phenylenedimaleimide, and 1.1 parts of the initiator and antioxidant butyraldehyde-aniline condensation product per 100 parts of the mixed polymers. Blends 9N-13N were prepared in the same manner as blends 1N-8N of Example 1 except for blend 13N the Plastograph was preheated to 170° C. and the rubber mill to 150°-170° C. Blends 9N-13N contain no crosslinking agents.

The proportions of polymers and the properties of the two series of compositions are listed in Table 2. The compositions identified as 9C-13C prepared using added crosslinking agents are illustrative of the invention. These compositions excel in tensile strength at break at room temperature and at 100° C., in resistance to compression set, and in resistance to oil swell. Toluene extraction of compositions 9C-13C demonstrated flaws in the remolded slabs. Compositions 1C-13C which are illustrative of the invention can be remolded into void free slabs thus demonstrating their thermoplastic character.

TABLE 2

| Composition | Chlorosulfonated Polyethylene (CSPE) | Copolyester Elastomer A or B | Tensile Strength At Break (MPa) | Elongation At Break (%) | Compression Set Resistance (%) | % Volume Swell ASTM #3 Oil 7 days 100° C. | Tensile Strength At Break At 100° C. (MPa) | Solubility in Toluene of | |
|---|---|---|---|---|---|---|---|---|---|
| | | | | | | | | Composition (wt %) | Chlorosulfonated Polyethylene (wt %) |
| 9C | CSPE A | A | 11 | 285 | 42 | 76 | 2.8 | 5.6 | 7.5 |
| 9N | CSPE A | A | 0.9 | 200 | 100+ | 301 | 0.1 | 60 | 98 |
| 10C | CSPE B | A | 15 | 300 | 58 | 36 | 2.0 | 9.9 | 15 |
| 10N | CSPE B | A | 11 | 940 | 95+ | 56 | 0.6 | 54 | 87 |
| 11C | CSPE D | A | 19 | 415 | 44 | 52 | 2.8 | 5.6 | 7.5 |
| 11N | CSPE D | A | 4.3 | 1300 | 88 | 102 | 0.5 | 59 | 96 |
| 12C | CSPE E | A | 14 | 325 | 57 | 36 | 1.8 | 11 | 16 |
| 12N | CSPE E | A | 12 | 950 | 96+ | 68 | 0.5 | 60 | 98 |
| 13C | CSPE C | B | 18 | 370 | 42 | 51 | 3.1 | 8.1 | 11 |
| 13N | CSPE C | B | 5.5 | 850 | 82 | 134 | 1.2 | 61 | 99 | that more than 65% of the chlorosulfonated polyethylene elastomer component of the blends was not extractable by toluene due to being crosslinked. Those blends identified as 9N-13N are Comparative Examples prepared without crosslinking agents.

In preparing the compositions of the present invention it is important that crosslinking of the chlorosulfonated polyethylene elastomer takes place while the compositions are subjected to mixing and shearing so that the chlorosulfonated polyethylene elastomer component is dispersed in the copolyester elastomer component. Alternatively the chlorosulfonated polyethylene can be crosslinked, ground into small particles, and then mixed with the copolyester elastomer component. The crosslinking agents employed in compositions 9C-12C were added to compositions 9N-12N on a rubber mill held at room temperature so that crosslinking would not occur. Blends 9N-12N with the added crosslinking agents were then compression molded for 15 minutes at 160° C. to crosslink the chlorosulfonated polyethylene elastomer component of the blends while forming 75 mil slabs free of apparent defects. The resulting slabs were cut up and remolded for 3 minutes at 200° C. They formed 75 mil slabs which contained many voids and flaws. Compositions such as those, described hereinabove, in which crosslinking of the chlorosulfonated polyethylene elastomer occurred in the absence of mixing and shearing are not thermoplastic, as demonstrated by their lack of remoldability as evidenced by the many

EXAMPLE 3

Before mixing, both polymers were dried for 2 hours at 120° C. under reduced pressure with a nitrogen atmosphere. Compositions of a multi-block copolyester elastomer (Copolyester A) with Chlorosulfonated polyethylene elastomer C were prepared using a variety of different crosslinking systems for the chlorosulfonated polyethylene. All of the compositions were prepared using a Brabender Plastograph preheated to 160° C. and a rubber mill heated to 130°-180° C. Composition 14C was prepared by mixing the polymers together in the Plastograph for 6 minutes, adding N,N'-metaphenylenedimaleimide and mixing for 1 minute, adding dicumyl peroxide and mixing for 3 minutes past the time of maximum torque on the rotors of the Plastograph, followed by about 3 minutes mixing on the rubber mill and a final 2 minutes of mixing in the Plastograph. Blend 14N was mixed for 6 minutes in the Plastograph, about 3 minutes on the rubber mill and a final 2 minutes in the Plastograph. Compositions 15C-17C were prepared by mixing the polymers together in the Plastograph for 6 minutes, adding the crosslinking agents and mixing for 3 minutes past the time of maximum torque on the rotors of the Plastograph, followed by about 3 minutes mixing on the rubber mill and a final 2 minutes of mixing in the Plastograph. Blend 5N was prepared as described in Example 1. Blends 5N and 14N contain no crosslinking agents and are present only for comparison purposes.

TABLE 3

| | 14C | 14N | 15C | 16C | 17C | 6N |
|---|---|---|---|---|---|---|
| Composition Components (parts by weight) | | | | | | |
| Copolyester A | 50 | 50 | 40 | 40 | 40 | 40 |
| Chlorosulfonated Polyethylene C | 50 | 50 | 60 | 60 | 60 | 60 |
| N,N'—meta-phenylenedimaleimide | 1 | | | | | |
| 40% dicumyl peroxide on calcium carbonate ("DiCup" 40C) | 1 | | | | | |
| magnesium oxide ("Maglite" D) | | | 2.9 | | | |
| fumed litharge | | | | | 21 | |
| epoxy resin ("Epon" 828) | | | | 10 | | |
| pentaerythritol (PER 200) | | | 2.1 | 1 | | |
| dipentamethylene thiuram hexasulfide ("Tetrone" A) | | | 1.4 | 0.3 | 1.4 | |
| 2,2'-dibenzothiazyl disulfide (MBTS) | | | | 0.1 | 0.3 | |
| Composition Properties | | | | | | |
| tensile strength at break (MPa) | 13 | 9.5 | 18 | 19 | 13 | 4.6 |
| elongation at break (%) | 465 | 860 | 465 | 510 | 185 | 1070 |
| compression set (%) | 64 | 79 | 62 | 52 | 56 | 99+ |
| % volume swell ASTM #3 oil, | 56 | 120 | 61 | 55 | 57 | fused |

TABLE 3-continued

|  | 14C | 14N | 15C | 16C | 17C | 6N |
|---|---|---|---|---|---|---|
| 7 days/100° C. |  |  |  |  |  |  |
| tensile strength at break at 100° C. | 1.9 | 0.6 | 3.0 | 1.7 | 2.0 | 0.4 |
| solubility in toluene of |  |  |  |  |  |  |
| composition (wt %) | 14 | 51 | 7.7 | 16 | 5.8 | 63 |
| chlorosulfonated polyethylene (wt %) | 25 | 98 | 12 | 28 | 9.6 | 103 |

It can be seen from the results obtained and recorded in Table 3 above that the compositions prepared using crosslinking agents while mixing, compositions 14C–17C, excel in tensile strength at break at both room temperature and at 100° C., in resistance to compression set, and in resistance to oil swell. Compositions 14C–17C are remoldable thus demonstrating their thermoplastic character. Toluene extraction of blends 14C–17C demonstrated that more than 65% (wt) of the chlorosulfonated polyethylene elastomer in the compositions is crosslinked and thus not extractable by toluene.

EXAMPLE 4

Chlorosulfonated polyethylene elastomer C was mixed on a rubber mill at about room temperature with curatives in the ratio 100 parts of chlorosulfonated polyethylene to 4 parts of calcium hydroxide, 3 parts of the crosslinking agent, N,N'-meta-phenylenedimaleimide, and 2 parts of butyraldehyde-aniline condensation product. The resulting stock was cured for 30 minutes at 160° C. as compression-molded slabs. The crosslinked slabs were ground to a powder in a Bantam Micropulverizer at low temperatures. The resulting crosslinked and powdered Chlorosulfonated polyethylene C was mixed with Copolyester C in the following manner: the polymers were mixed for 10 minutes at 160° C. at 90 rpm under nitrogen in a small Haake mixer equipped with cam rotor blades, the composition was mixed on a rubber mill at about 160° C. for a few minutes and then remixed in the Haake mixer for two minutes under the original conditions. The polymer proportions and the properties of the composition are shown in Table 4. The composition of Table 4 which is illustrative of the present invention excels in tensile strength at break at room temperature and at 10° C., in resistance to compression set, and in resistance to oil swell.

TABLE 4

| Composition Components (parts by weight) | |
|---|---|
| Copolyester A | 40 |
| crosslinked and powdered | |
| Chlorosulfonated Polyethylene C | 60 |
| Composition Properties | |
| tensile strength at break (MPa) | 15 |
| elongation at break (%) | 515 |
| compression set (%) | 59 |
| % volume swell ASTM #3 oil, 7 days/100° C. | 59 |
| tensile strength at break at 100° C. | 2.2 |
| solubility in toluene of | |
| composition (wt %) | 11 |
| chlorosulfonated polyethylene (wt %) | 15 |

EXAMPLE 5

Before blending, the polymers were dried for 2 hours at 120° C. under reduced pressure with a nitrogen atmosphere. A series of compositions were prepared with multi-block Copolyester A and Chlorosulfonated polyethylene elastomer C. The compositions contained equal amounts of each polymer and varying amounts of filler and oil. The filler was carbon black and the oil was Sundex 790 aromatic oil ASTM D2226.

The component proportions and properties of the compositions are listed in Table 5. The compositions were prepared by mixing the polymers together for 6 minutes in the Plastograph preheated to 160° C., adding filler and oil, or nothing, as called for in the composition recipe in Table 5, and mixing for 2 minutes, adding calcium oxide and mixing for 1 minute, add N,N'-meta-phenylenedimaleimide and mixing for 1 minute, adding butyraldehyde-aniline condensation product ("Vanox" AT) and mixing for 3 minutes past the time of maximum torque (maximum torque was attained in less than 2 minutes). The compositions were then mixed for about 3 minutes on a 2-roll rubber mill heated to about 160° C. and finally for an additional 2 minutes in the Plastograph preheated to 160° C. The excellent properties of all four compositions listed in Table 5 demonstrate that the invention can be carried out either in the presence or in the absence of filler and oil additives.

TABLE 5

|  | 19C | 20C | 21C | 22C |
|---|---|---|---|---|
| Composition Components | | | | |
| Copolyester A | 50 | 50 | 50 | 50 |
| Chlorosulfonated Polyethylene C | 50 | 50 | 50 | 50 |
| carbon black ASTM N744 |  | 22.5 | 27.5 | 55 |
| aromatic oil, ASTM D2226, type 102 |  |  | 15 | 30 |
| calcium oxide | 2 | 2 | 2 | 2 |
| N,N'—meta-phenylenedimaleimide | 1.57 | 1.5 | 1.5 | 1.5 |
| butyraldehyde-aniline condensation product | 1 | 1 | 1 | 1 |
| Composition Properties | | | | |
| tensile strength at break (MPa) | 17 | 21 | 15 | 14 |
| elongation at break (%) | 380 | 310 | 340 | 230 |
| compression set (%) | 54 | 53 | 52 | 40 |
| tensile strength at break at 100° C. | 2.5 | 3.9 | 2.2 | 2.5 |
| tear strength, pli | 4.9 | 8.2 | 11 | 7.2 |

I claim:

1. A thermoplastic composition comprising about 10–80 parts by weight total polymers of a multi-block copolyester elastomer having a melting point of from about 100°–200° C. and about 20–90 parts by weight total polymers of a crosslinked chlorosulfonated polyethylene elastomer wherein crosslinking takes place during mixing and shearing or the crosslinked elastomer is crosslinked and ground into small particles, said crosslinked elastomer being dispersed in said copolyester elastomer, said chlorosulfonated polyethylene elastomer being crosslinked to an extent such that not more than about 45% by weight of said elastomer is extractable with toluene at 25° C.

2. A thermoplastic composition comprising about 10–80 parts by weight total polymers of a multi-block copolyester elastomer having a melting point of from about 100°–200° C. and about 20–90 parts by weight total polymers of a crosslinked chlorosulfonated polyethylene elastomer wherein crosslinking takes place during mixing and shearing, said crosslinked elastomer dispersed in said copolyester elastomer, said chlorosulfonated polyethylene elastomer crosslinked to an extent such that not more than about 45% by weight of said elastomer is extractable with toluene at 25' C.

3. A composition of claim 2 wherein the multi-block copolyester elastomer consists essentially of (A) repeating high melting point blocks comprising repeating short chain ester units having the formula:

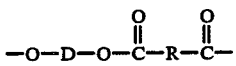

wherein D is a divalent radical remaining after removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer which consists essentially of short-chain ester units having a number average molecular weight of at least 5000 has a melting point above 100° C., (B) repeating low melting point blocks which are derived from compounds containing hydroxyl or carboxyl groups or mixtures thereof and has a number average molecular weight of 400–4000 and a melting point not greater than 100° C., and (C) an amount of difunctional radicals sufficient to join repeating blocks of (A) and (B) to form multi-block copolyester elastomers, the weight ratio of (A) to (B) being from about 1:4 to 1:0.1.

4. A composition of claim 2 wherein the chlorosulfonated polyethylene contains 15–50% by weight chlorine and 0.1–4% by weight sulfur as sulfonyl chloride groups.

5. A composition of claim 3 wherein the copolyester has high melting point blocks derived from ethylene glycol or 1,4-butanediol and terephthalic acid or mixtures thereof containing up to about 30% by weight isophthalic or phthalic acid.

6. A composition of claim 3 wherein the copolyester has low melting point blocks derived from poly(alkylene oxide) glycols having a carbon to oxygen ratio of about 2.0–4.3 and a number average molecular weight of from about 400–4000.

7. A composition of claim 6 wherein the poly(alkylene oxide)glycol is poly(tetramethylene oxide)glycol having a number average molecular weight of from about 600–2000.

8. A composition of claim 6 wherein the poly(alkylene oxide) glycol is ethylene oxide capped poly(propylene oxide) glycol having a number average molecular weight of 1500–2800 and an ethylene oxide content of 15–35% by weight.

9. A composition of claim 3 wherein the low melting point blocks are derived from polyester glycols.

10. A composition of claim 9 wherein the polyester glycol is poly(tetramethylene adipate) glycol or polycaprolactone glycol having a number average molecular weight of from 800–2500.

11. A composition of claim 3 wherein the multi-block copolyester elastomer consists essentially of high melting point blocks derived from 1,4-butanediol and a mixture of terephthalic acid and isophthalic acid or esters thereof, and low melting point blocks derived from poly(tetramethylene oxide) glycol having a number average molecular weight of about 800–1200, the weight ratio of the high melting point blocks to low melting point blocks being from 1:2 to 1:0.5.

12. A composition of claim 2 wherein not more than about 35% by weight of said elastomer is extractable with toluene at 25° C.

13. A composition of claim 2 wherein the multi-block copolyester elastomer has a melting point of from about 130°–180° C.

14. A composition of claim 2 comprising 20–60 parts by weight total polymers of a multi-block copolyester elastomer and about 40–80 parts by weight total polymers of a crosslinked chlorosulfonated polyethylene elastomer.

* * * * *